United States Patent

Adachi et al.

[11] Patent Number: 5,828,155
[45] Date of Patent: Oct. 27, 1998

[54] ALTERNATING CURRENT GENERATOR

[75] Inventors: Katsumi Adachi; Kyoko Kurusu, both of Tokyo, Japan

[73] Assignee: Mitsubishi Denki Kabushiki Kaisha, Tokyo, Japan

[21] Appl. No.: 659,240

[22] Filed: Jun. 5, 1996

[30] Foreign Application Priority Data

Dec. 8, 1995 [JP] Japan ..................... 7-320060

[51] Int. Cl.⁶ .............................. H02K 1/00; H02K 1/22; H02K 1/27
[52] U.S. Cl. ............................ 310/263; 310/181
[58] Field of Search ..................... 310/181, 263

[56] References Cited

U.S. PATENT DOCUMENTS

| | | | |
|---|---|---|---|
| 3,230,404 | 1/1966 | Graham | 310/263 |
| 5,306,977 | 4/1994 | Hayashi | 310/263 |
| 5,329,199 | 7/1994 | Yockey et al. | 310/263 |
| 5,483,166 | 1/1996 | Kusase et al. | 310/263 |
| 5,519,277 | 5/1996 | York et al. | 310/263 |
| 5,539,265 | 7/1996 | Harris et al. | 310/263 |
| 5,578,885 | 11/1996 | Alford et al. | 310/263 |

FOREIGN PATENT DOCUMENTS

| | | | |
|---|---|---|---|
| 0188877 | 7/1986 | European Pat. Off. | H02K 3/34 |
| 0394528 | 10/1990 | European Pat. Off. | H02K 21/14 |
| 54-116610 | 9/1979 | Japan | H02K 19/22 |
| 61-85045 | 4/1986 | Japan | H02K 21/04 |
| 3-265450 | 11/1991 | Japan | H02K 19/22 |
| 4-49836 | 2/1992 | Japan | H02K 19/22 |
| 1560747 | 2/1980 | United Kingdom | H02K 19/24 |
| 2111761 | 7/1983 | United Kingdom | H02K 1/22 |
| 2281665 | 3/1995 | United Kingdom | H02K 1/27 |

*Primary Examiner*—Clayton E. LaBalle
*Attorney, Agent, or Firm*—Sughrue, Mion, Zinn, Macpeak & Seas, PLLC

[57] ABSTRACT

An alternating current generator for a vehicle, in which durability is improved, magnetic fluxes are prevented from leaking, and noises are reduced. In the alternating current generator, a ring made of a steel material is disposed so as to abut against field core claws and on the outer peripheral side of a field winding. Resin permanent magnets which are molded onto the ring are disposed between the field core claws so as to abut against the field core claws, respectively.

5 Claims, 5 Drawing Sheets

ALTERNATING CURRENT GENERATOR

BACKGROUND OF THE INVENTION

The invention relates to an alternating current generator (hereinafter, referred to as AC generator) which is to be mounted on a vehicle or the like.

Generally, a technique is known in which, in an AC generator, permanent magnets are disposed between field core claws of a rotor so that magnetic fluxes are prevented from leaking, as disclosed in, for example, Unexamined Japanese patent publication (Kokai) 54-116610.

A technique in which, in order to prevent magnets from being separated from a rotor by a centrifugal caused by revolution of the rotor, a flange is extended from each magnet in the circumferential direction, or the magnets are formed into a substantially annular shape is disclosed in, for example, Unexamined Japanese patent publications (Kokai) 61-85045 and 4-49836.

Furthermore, a technique in which, in order to suppress wind noises generated by field core claws, a nonmagnetic ring is disposed at the same level as the outer peripheries of the field core claws is disclosed in, for example, Unexamined Japanese patent publication (Kokai) 3-265450.

In such conventional AC generators for a vehicle, however, a magnetic attraction force which changes in magnitude at a frequency proportional to the number of revolutions of a rotor is generated between a stator core and a field core or, more precisely, in small gaps between teeth of the stator core and field core claws. The components resonate at the fluctuation frequency of the magnetic attraction force, thereby generating noises which are called electromagnetic noises. According to the natural vibration mode (natural frequency) of the resonating component, the electromagnetic noises are classified into a low-speed electromagnetic noise which is generated at low-speed running mainly by resonation of the stator, and a high-speed electromagnetic noise which is generated at high-speed running mainly by resonation of the field core claws. Particularly, the high-speed electromagnetic noise which is caused when the rotor revolves at a high speed becomes a problem.

When a gap is formed between field core claws and permanent magnets disposed between the field core claws, the permanent magnets may move during revolution of the rotor to collide against the field core claws, with the result that the permanent magnets are broken.

SUMMARY OF THE INVENTION

The invention has been conducted in order to solve the above-discussed problems. It is an object of the invention to provide an alternating current generator which is low in noise level and excellent in efficiency.

It is another object of the invention to provide an alternating current generator which can be easily assembled and in which permanent magnets are surely fixed.

An alternating current generator of the invention comprises a rotor having a field core and a field winding, a stator opposing the rotor, and a plurality of field core claws disposed on the field core, the rotor being revolved by an external driving force, and further comprises a metal ring portion which is disposed so as to abut against and hold the field core claws, and resin permanent magnet portions which are fixed to the ring portion and disposed between the field core claws.

Further, an alternating current generator comprises a rotor having a field core and a field winding, a stator opposing the rotor, and a plurality of field core claws disposed on the field core, the rotor being revolved by an external driving force, and further comprises a holding member which holds permanent magnets disposed between the field core claws, and a rugged portion is formed on a face of the holding member or faces of the permanent magnet, the face or faces abutting against the field core claws.

Furthermore, an alternating-current generator comprises a rotor having a field core and a field winding, a stator opposing the rotor, and a plurality of field core claws disposed on the field core, the rotor being revolved by an external driving force, and further comprises resin permanent magnet portions which are disposed between the field core claws, and a rugged portion is formed on faces of the resin permanent magnets, the faces abutting against the field core claws.

The natural frequency of the ring portion is higher than at least the natural frequency of the field core claws.

The coefficient of thermal expansion of the ring portion is greater than at least the coefficient of thermal expansion of the field core claws.

DETAILED DESCRIPTION OF THE PREFERRED EMBODIMENTS

Hereinafter, embodiments of the invention will be described.

Figure 1:
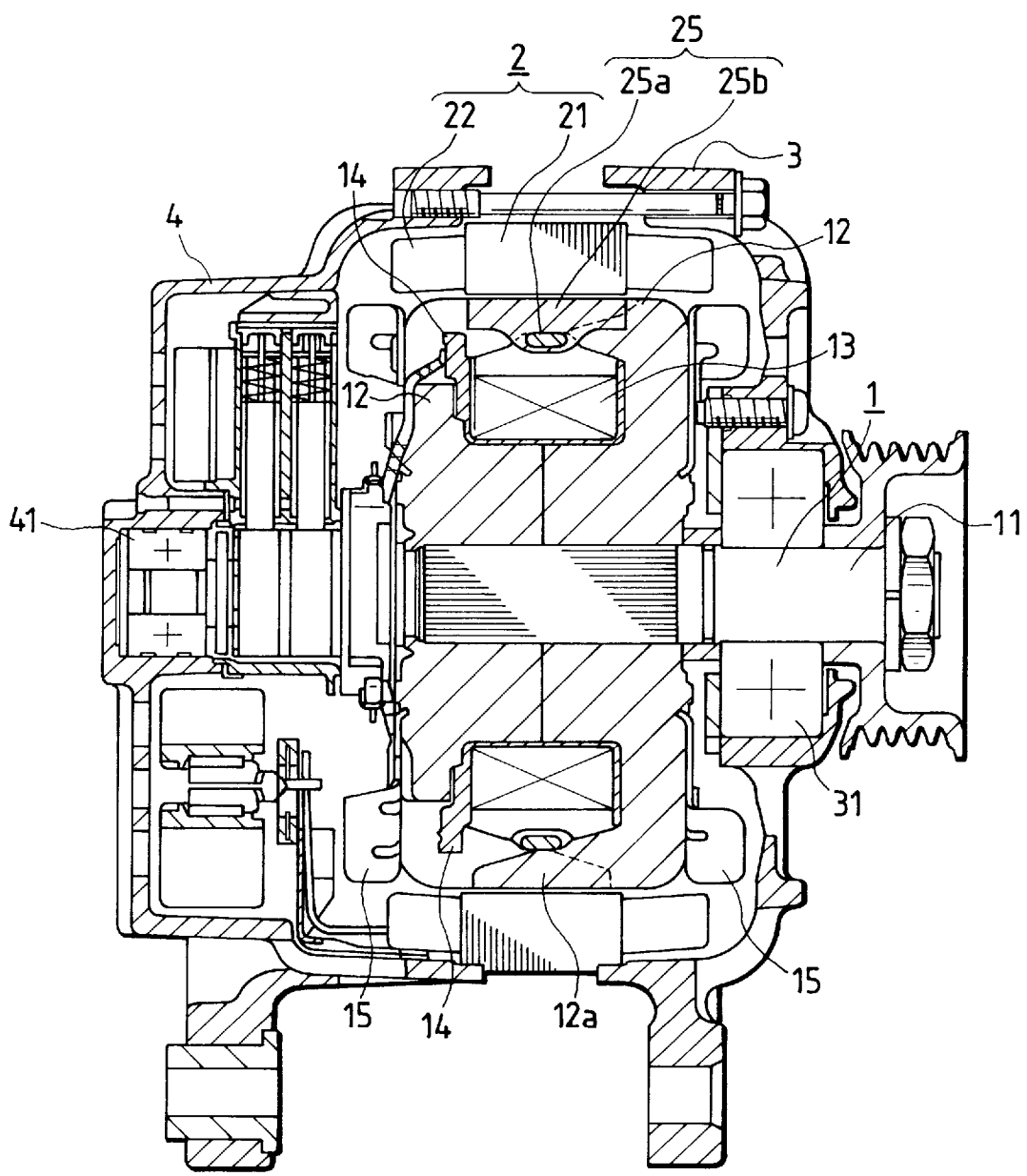
FIG. 1 is a section view showing an AC generator for a vehicle according to Embodiment 1 of the invention.
Figure 2:
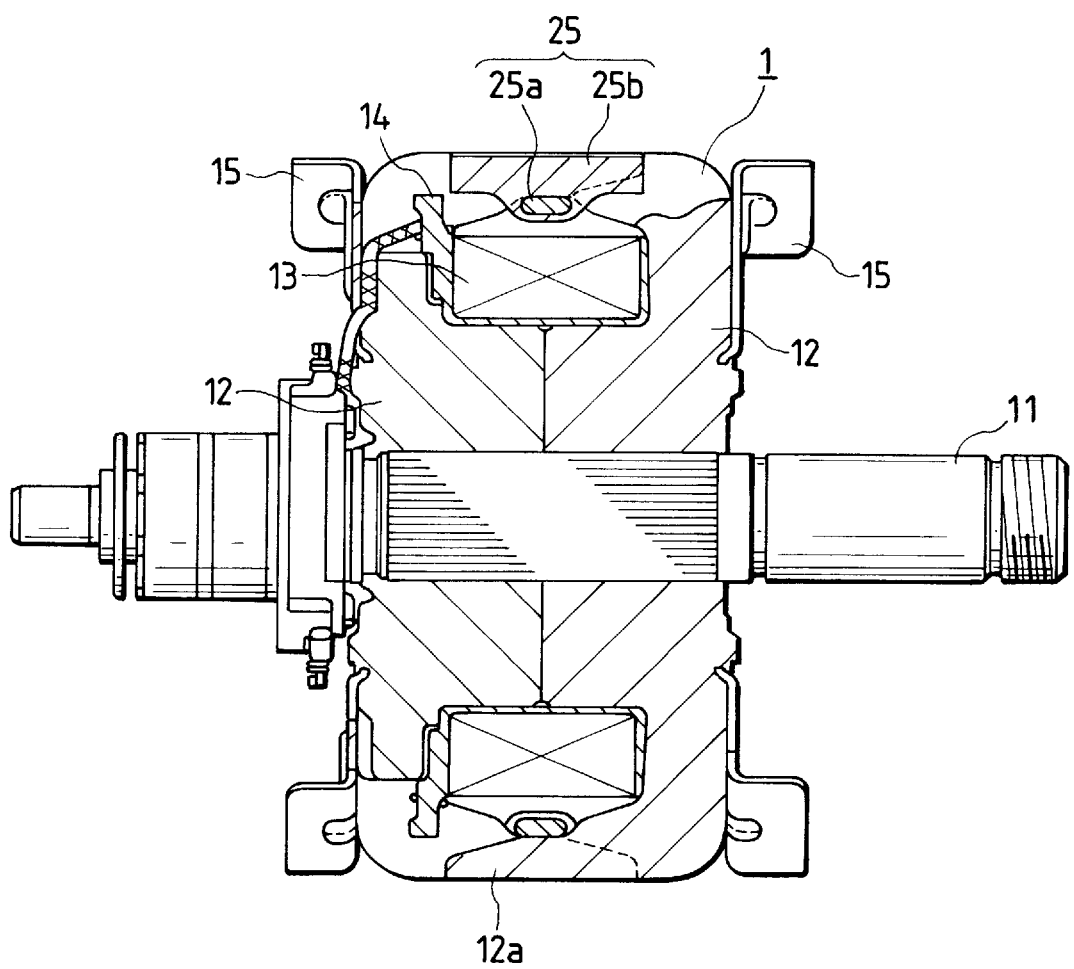
FIG. 2 is a section view showing a rotor in Embodiment 1 of the invention.
Figure 3:
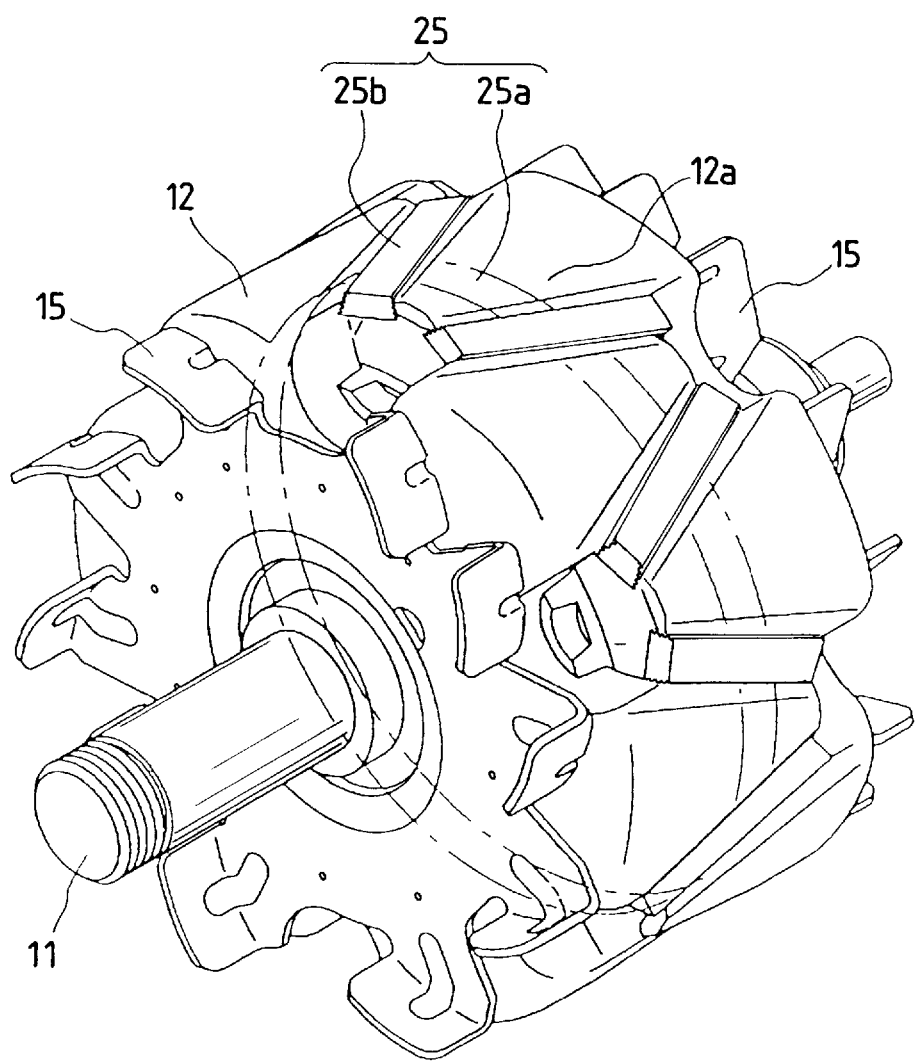
FIG. 3 is a perspective view showing the rotor in Embodiment 1 of the invention.
Figure 4:
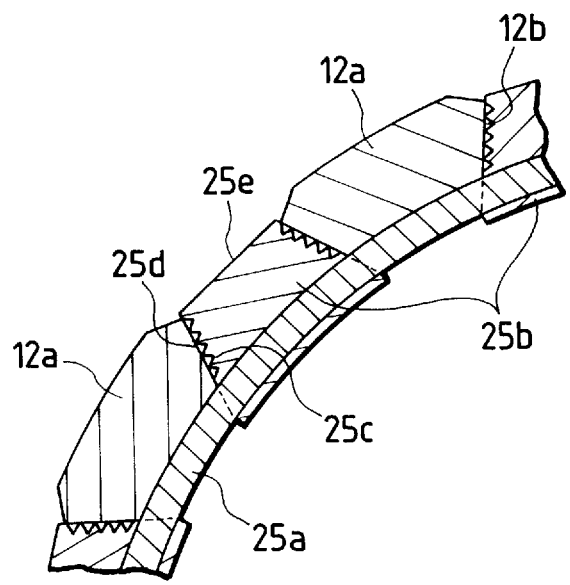
FIG. 4 is a partial section view showing a holding member and field core claws in Embodiment 1 of the invention.
Figure 5:
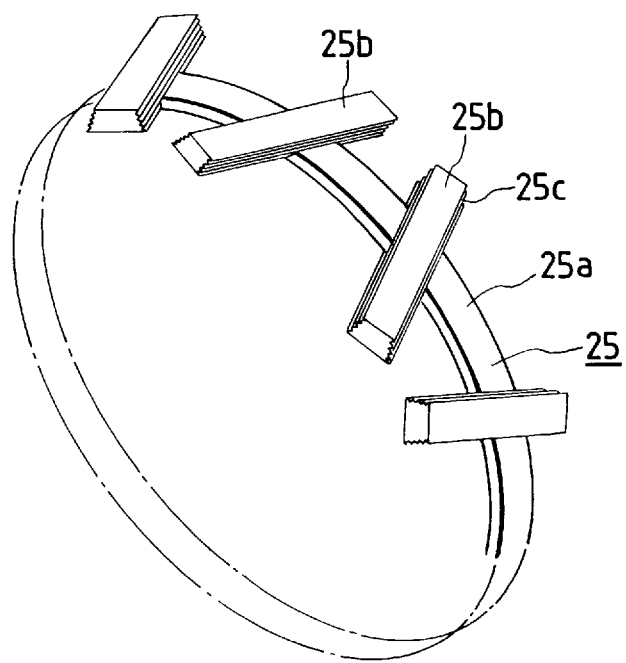
FIG. 5 is a perspective view showing the holding member in Embodiment 1 of the invention.
Figure 6:
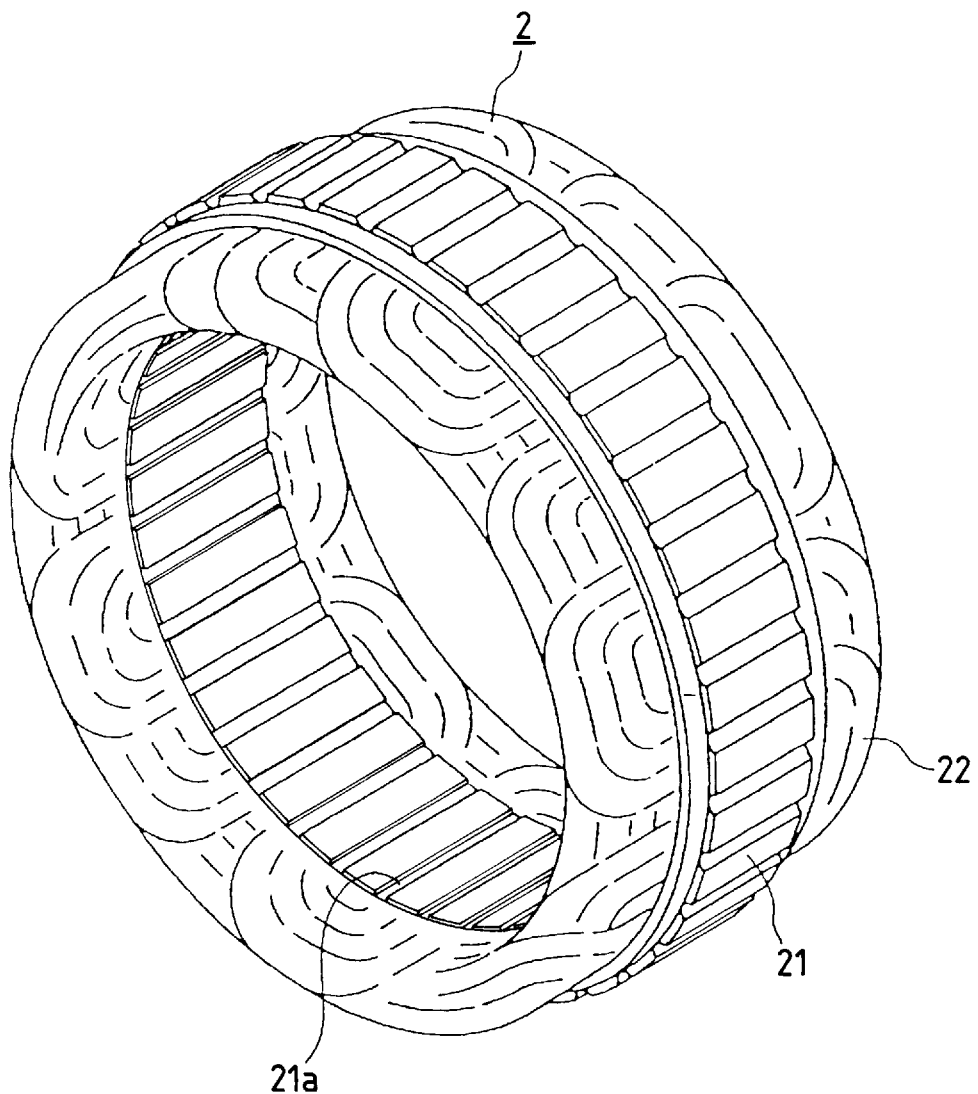
FIG. 6 is a perspective view showing a stator in Embodiment 1 of the invention.

FIG. 1 is a section view showing an AC generator for a vehicle according to Embodiment 1, FIG. 2 is a section view showing a rotor, FIG. 3 is a perspective view showing the rotor, FIG. 4 is a partial section view showing field core claws and a holding member of the rotor, FIG. 5 is a perspective view showing the holding member, and FIG. 6 is a perspective view showing a stator.

In the figures, 1 designates a rotor, 11 designates a rotating shaft which is driven by a driving force transmitted from an internal combustion engine of the vehicle (not shown) via a belt, and 12 designates a pair of roundel-type field cores which are made of steel and fitted onto the rotating shaft 11. Field core claws 12a are protruded from the field cores 12 and then bent in a substantially perpendicular manner so as to have the shape such as shown in FIG. 3. The reference numeral 13 designates a field winding, and 14 designates a winding bobbin. The pair of field cores 12 are disposed in such a manner that they oppose each other with the field winding 13 and the winding bobbin 14 therebetween and the field core claws 12a engage with each other.

A cooling fan 15 is fixedly attached by welding or the like to each of the side faces of the assembly of the field cores 12. The reference numeral 2 designates a stator which has a stator core 21 and a stator winding 22 as shown in FIG. 6.

Stator core teeth 21a are formed on the surface of the stator core 21. The surface of the stator core 21 opposes the rotor 1 with being separated therefrom by a small gap. The reference numeral 3 designates a front bracket, and 4 designates a rear bracket. The rotor 1 is rotatably supported by the brackets via bearings 31 and 41. The stator 2 is sandwiched between the front and rear brackets 3 and 4.

The reference numeral 25 designates a holding member which is disposed between the engaging field core claws 12a and in a direction of the field winding 13. The holding member comprises an annular ring portion 25a which is made of steel and positioned between the field winding 13 and the field core claws 12a so as to serve as a base material of the holding member 25, and resin permanent magnet portions 25b each configured by a permanent magnet which is formed by solidifying a resin solution containing permanent magnet powder. The resin permanent magnet portions 25b are formed by molding so as to surround the ring portion 25a, and placed as shown in FIG. 3 so as to respectively fill the gaps between the field core claws 12a when the pair of field cores 12 are assembled.

As shown in FIG. 4, a rugged portion 25c is formed on each of faces 25d of the resin permanent magnet portions 25b which abut against the side faces 12b of the field core claws 12a, by forming a plurality of grooves when the permanent magnet portions are molded. When the field cores are to be assembled, the rugged portions 25c abut against the respective side faces 12b of the field core claws 12a, whereby dimensional errors of the field core claws 12a and variations in assembly are absorbed so as not to form a gap between the side faces 12b of the field core claws 12a and the resin permanent magnet portions 25b. After assembling, the rugged portions 25c of the resin permanent magnet portions 25b are pressed in both lateral directions by the field core claws 12a so that fixation is surely conducted.

Since the resin permanent magnet portions 25b are disposed in the gaps between the field core claws 12a, wind noises which are generated by the field core claws 12a during revolution of the rotor 1 is reduced in level.

In the rugged portions 25c, as shown in FIGS. 4 and 5, the grooves are formed in parallel with the axial direction of the rotating shaft 11. Alternatively, the grooves may be formed in a direction perpendicular to the rotating shaft 11, or at random. The rugged portions 25c may have a shape in which a plurality of substantially hemispherical protrusions are formed.

The ring portion 25a abuts against the inner sides of the field core claws 12a so as to hold the claws 12a. The field core claws 12a are protruded from the body of the field cores 12 and then bent. According to this shape, the natural frequency of the field core claws 12a is lower than that of the body of the field cores 12 so that the field core claws 12a resonate at the fluctuation frequency of the magnetic attraction force. In order to prevent this phenomenon from occurring, the ring portion 25a holds the field core claws 12a so as to improve the rigidity of the field core claws 12a themselves, thereby changing the natural frequency of the field core claws 12a. This prevents the field core claws 12a from resonating at the fluctuation frequency of the magnetic attraction force which is generated during the use of the AC generator.

In the embodiment, the natural frequency of the field core claws 12a is raised by holding them by the ring portion 25a, and hence the field core claws 12a do not resonate at the fluctuation frequency of the magnetic attraction force which may be generated in the usual use range. In this way, resonation of the field core claws 12a is suppressed by disposing the ring portion 25a, thereby preventing the field core claws 12a from generating noises.

As described above, the ring portion 25a holds the field core claws 12a while abutting against the claws, thereby raising the natural frequency of the field core claws 12a. When the ring portion 25a is greater in rigidity or higher in natural frequency than the field core claws 12a, it is possible to raise more surely the natural frequency of the field core claws 12a, and hence noises are prevented more surely from being generated.

When the ring portion 25a is increased in rigidity and formed into, for example, a strip-like shape, the area of the portions where the ring portion 25a abuts against the field core claws 12a can be increased. This can cause the field core claws 12a to resonate more hardly.

In the embodiment, the ring portion 25a and the field core claws 12a are made of steel. The materials may be selected so that the coefficient of thermal expansion of the ring portion 25a is greater than that of the field core claws 12a. In this case, when heat is generated during operation of the AC generator and the portion and claws are thermally expanded, the ring portion 25a further presses the field core claws 12a so that fixation is more surely conducted and the natural frequency of the field core claws 12a is raised.

Since the ring portion 25a can have a simple shape such as an annular shape, it can be easily produced. After the ring portion 25a is formed, the field core claws 12a can be formed by molding so as to partly surround the ring portion 25a. Even when the field core claws 12a and the rugged portions 25c have a complex shape, therefore, they can be easily produced.

Next, the operation will be described.

In the thus configured AC generator for a vehicle, a current is supplied from a battery which is not shown to the field winding 13 to generate a magnetic field, and the rotor 1 is caused to revolve by a driving force transmitted via a belt which is not shown, whereby a rotating magnetic field is generated in the vicinity of the rotor 1. A current is generated by the rotating magnetic field in the stator winding 22 of the stator core 21 which is separated from the rotor 1 by the small gap. When a current flows through the field winding 13, magnetism of N-pole or S-pole appears in each of the field core claws 12a so that magnetic fluxes are generated between the field core claws 12a of N-pole and those of S-pole. The resin permanent magnet portions 25b are previously magnetized in a direction along which leakage fluxes among the magnetic fluxes are prevented. As a result, leakage fluxes which pass through the resin permanent magnet portions 25b are reduced and field fluxes which intersect the stator winding 22 are increased so that the generator efficiency is improved.

Next, the assembly of the rotor 1 will be described.

First, the holding member 25 is placed so as to abut against one of the paired field cores 12. At this time, also the field winding 13 and the winding bobbin 14 are placed. Thereafter, the other field core 12 is placed in such a manner that the holding member 25 is sandwiched by the field cores and the field core claws 12a alternately engage with each other.

At this time, the side faces 12b of the field core claws 12a abut against the side faces 25d of the resin permanent magnet portions 25b, respectively. Therefore, the protrusions of the rugged portions 25c in the side faces 25d of the resin permanent magnet portions 25b are pressed by the side faces 12b of the field core claws 12a so as to be somewhat deformed, whereby dimensional errors of the components are eliminated.

In this Embodiment configured as described, wind noises generated by revolution can be reduced by disposing the resin permanent magnet portions 25b between the adjacent side faces 12b of the engaging field core claws 12a so that the rotor 1 is formed as a whole into a substantially cylindrical shape. The resin permanent magnet portions 25b prevent magnetic fluxes from leaking from the field core claws 12a.

In order to facilitate production, fixation, etc., as shown in FIG. 5, the holding member 25 is configured so as to have a strip-like shape, i.e., a rectangular or elliptic section shape. Alternatively, the holding member may have another shape as far as it can hold the field core claws 12a from the inner side. Furthermore, a rugged portion may be disposed in areas of the holding member onto which the resin permanent magnet portions 25b are to be molded, so that fixation after molding is ensured.

The resin permanent magnet portions 25b are made of a resin and are not integrated with the field core claws 12a, and hence it is possible to absorb dimensional errors. Since the resin permanent magnet portions 25b are integrated with the ring portion 25a made of steel, they are not broken even when subjected to a centrifugal force generated by revolution of the rotor 1 of the vehicle generator which can reach about 18,000 rpm.

In the Embodiment, the resin permanent magnets abut against the field core claws in order to reduce leakage fluxes. Alternatively, a solid permanent magnet may be covered with a resin or the like, and a rugged portion may be formed on the resin.

What is claimed is:

1. A rotor for an alternating current generator, comprising:

field core claws disposed on a field core;

a metal ring portion abutting against and holding said field core claws; and resin permanent magnets being fixed to said metal ring portion and disposed between said field core claws;

wherein each of said resin permanent magnets abuts respective adjacent ones of said field core claws substantially without gaps therebetween.

2. The rotor according to claim 1, wherein a natural frequency of said metal ring portion is higher than that of said field core claws.

3. The rotor according to claim 1, wherein a coefficient of thermal expansion of said metal ring portion is greater than that of said field core claws.

4. The rotor according to claim 1, wherein a rugged portion formed on one of a face of said metal ring portion and faces of said permanent magnets abuts said field core claws.

5. The rotor according to claim 1, wherein said resin permanent magnets have faces with rugged portions that abut said field core claws.

* * * * *